Figure 1:
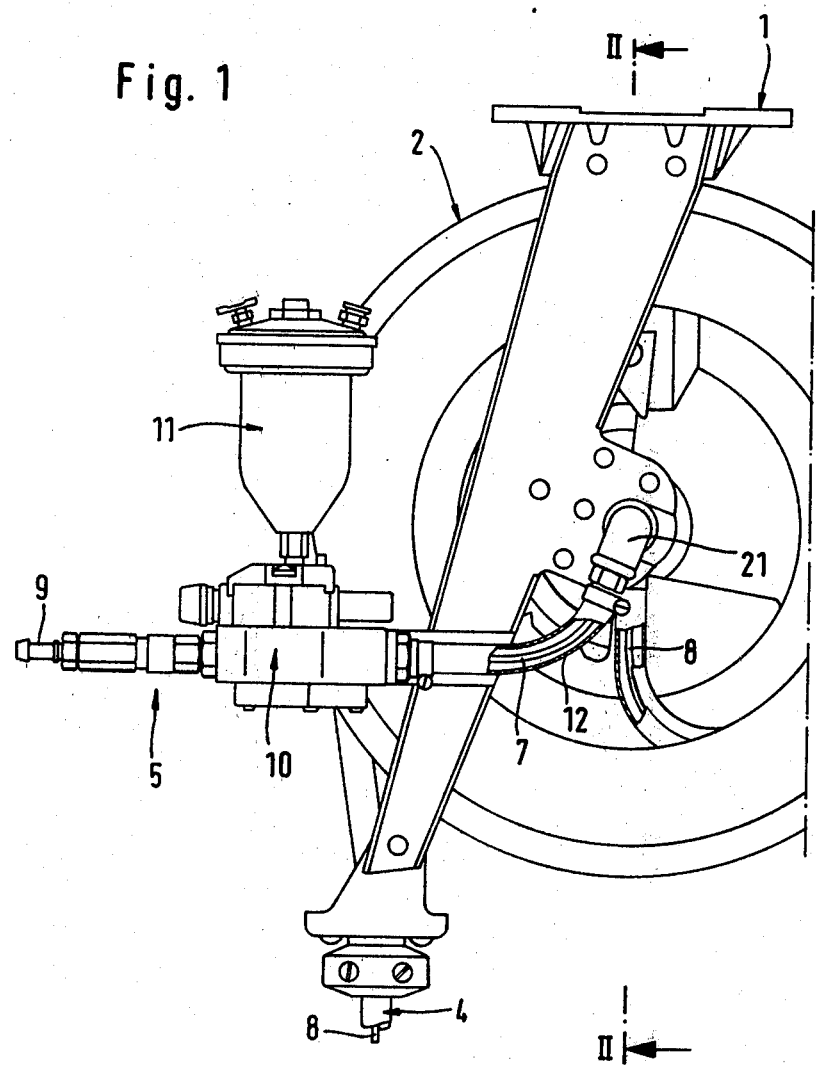

United States Patent [19]

Nederman

[11] 4,299,249
[45] Nov. 10, 1981

[54] DEVICE AT HOSE REELS

[76] Inventor: Bill P. Nederman, Halalid 3, S-252 33 Helsingborg, Sweden

[21] Appl. No.: 104,656

[22] Filed: Dec. 17, 1979

[30] Foreign Application Priority Data

Dec. 18, 1978 [SE] Sweden ............................. 7812959

[51] Int. Cl.³ ........................................... B65H 75/44
[52] U.S. Cl. .......................... 137/355.17; 137/355.26; 137/580; 285/134
[58] Field of Search ...................... 137/355.17, 355.26, 137/580; 285/119, 134, 272

[56] References Cited

U.S. PATENT DOCUMENTS

| 1,389,314 | 8/1921 | McMullin . | |
|---|---|---|---|
| 2,191,728 | 2/1940 | Purcell et al. . | |
| 2,219,201 | 10/1940 | Smith . | |
| 2,583,181 | 1/1952 | Kunz | 137/355.26 X |
| 2,629,630 | 2/1953 | Roark . | |
| 2,834,465 | 5/1958 | McMichael | 285/134 X |
| 3,523,550 | 8/1970 | Richardson . | |

FOREIGN PATENT DOCUMENTS 43-2510 1/1968 Japan .
48-39504 11/1973 Japan .
235036 6/1925 United Kingdom .

Primary Examiner—Gerald A. Michalsky
Attorney, Agent, or Firm—Bacon & Thomas

[57] ABSTRACT

The present invention relates to a device at hose reels having at least one windable hose (4) and at least one conduit (5) communicating with the hose via a swivel device (6).

In order to provide at such hose reels a simple device rendering it possible to use hoses for distributing a plurality of media separated from each other, the invention is characterized by at least one bearing element (27) which, on one hand, is mounted on the swivel device (6) permitting flow of medium between the conduit (5) and the hose (4) and, on the other hand, forms an inner passage (29) for flow of medium between inner tubes (7 and 8 respectively) within the hose and the conduit, whereby at least one of the inner tubes (8 and/or 7) is rotatably connected to the bearing element.

2 Claims, 3 Drawing Figures

DEVICE AT HOSE REELS

The present invention relates to a device at hose reels having at least one windable hose and at least one conduit communicating with the hose via a swivel device.

In many occasions hoses are now used to distribute various media where the media are distributed separate from each other. Such hoses have typically an inner tube in which one of the media is distributed while another medium is distributed outside the inner tube. Hoses of this type have been found very useful e.g. for compressed air-driven machines, since compressed air and oil for operating and lubrication of the machine may be distributed separate from each other until they have reached the machine where mixing occurs. However, it has heretofore not been possible to use such hoses at reeling devices of the abovementioned type.

The object of the present invention is to eliminate this problem and provide a simple device rendering it possible to use hoses for distributing a plurality of media separated from each other at hose reels having at least one windable hose and at least one conduit communicating with the hose via a swivel device.

According to the invention this is achieved substantially in that the device according to the invention has at least one bearing element which, on one hand, is mounted in the swivel device permitting flow of medium between the conduit and the hose and, on the other hand, forms an inner passage for flow of medium between inner tubes within the hose and the conduit, whereby at least one of the inner tubes is rotatably connected to the bearing element.

Figure 2:
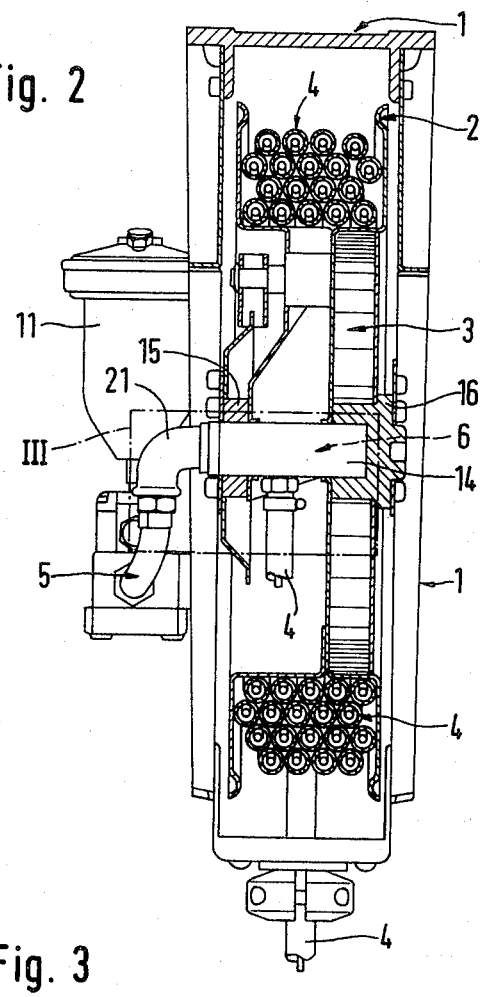
Figure 3:
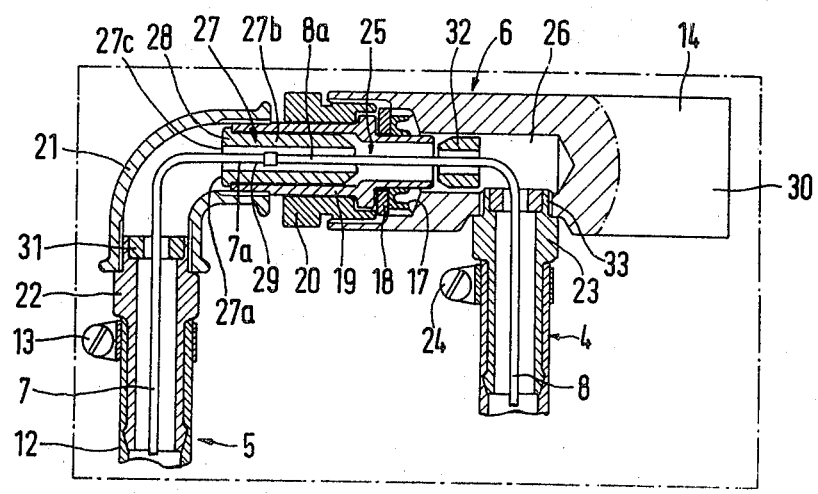

The invention will be described in more detail in the following description and with reference to the accompanying drawings, in which FIG. 1 is a sideview of a hose reel with a device according to the invention, FIG. 2 is a section along the line II—II in FIG. 1 and FIG. 3 is a section in enlarged scale through members in section III in FIG. 2.

In the drawings a conventional hose reel is shown having a mountable frame 1 with a rotatably mounted hose winding drum 2, which drum is rotated by means of a spring device 3 for winding up a hose 4. The design and function of all these members is well known and are therefore not described in further detail.

At the hose reel shown, the hose 4 communicates with a conduit 5 via a swivel device 6. The conduit 5 and the hose 4 are designed, on one hand, for distributing compressed air from a compressed-air source (not shown) to a compressed air-driven machine (not shown) and on the other hand, for distributing oil from an oil supply (not shown) to the compressed air-driven machine for lubrication thereof. In order to enable distribution of the oil separate from the compressed air until the oil reaches the machine in which the oil mixes with the compressed air, the hose 4 and the conduit 5 have inner tubes 7 and 8 respectively, in which the oil is distributed.

The conduit 5 is provided with a hose nipple 9 which, one one hand, is connected to the compressed-air source via a hose (not shown) and on the other hand, communicates with a channel (not shown) in a frame mounted carrier 10 for an oil container 11 from which the inner tube 7 of the conduit extends. The inner tube 7 runs through the channel in the carrier forming part of the conduit 5 and through a hose piece 12 connected to the carrier 10 and forming part of the conduit 5 and also connected to the swivel device 6 and retained thereto by means of a hose clamp 13. The swivel device is mounted in a shaft 14 of the winding drum 2, said shaft rotating with the drum and being rotatably mounted in the frame via bearing elements 15 and 16. An annular packing 17, a support ring 18 for the packing, a swivel shaft 19 and a bearing 20 for the shaft are mounted in the shaft 14. The annular packing 17 forms a seal between the shaft 14 of the drum 2 and the shaft 19 of the swivel which is kept in position by the bearing 20 that is screwed onto the shaft 14. The swivel shaft 19 is fixedly mounted at a tube bend 21 which does not rotate and is provided with a hose connection 22, to which the hose piece 12 is connected. At the shaft 14 of the drum 2 is also mounted a hose connection 23 at which an inner part of the windable hose 4 is arranged by means of a hose clamp 24. The interior of the conduit 5 communicates with the interior of the hose 4 via a channel 25 which runs through the swivel device 6 and is defined by a bore 26 in the shaft 14 and branches in the swivel shaft 19 and the bend 21.

To enable in a simple way the use of a conduit 5 and hose 4 with inner tubes 7 and 8 respectively, at hose reels of the above type, the swivel device 6 includes a bearing element 27, which, on one hand, has outer passages 28 to permit flow of medium in the channel 25 and, on the other hand, has an inner passage 29 for flow of medium between the inner tubes 7, 8 of the conduit and hose respectively, whereby at least one of said inner tubes 8 and/or 7 is rotatably connected to the bearing element 27. In order to ensure an as vibrationless rotation as possible, at least one of the inner tubes 8 and/or 7 may be connected to the bearing element 27 via at least one connecting portion 8a and/or 7a, which runs coaxially with an axis 30 of rotation for rotatable members of the swivel device 6. Regarding the vibrationless rotation it is especially advantageous if connecting portions 7a and 8a of the inner tubes 7 and 8 of the hose 4 as well as the conduit 5 and the passage 29 in the bearing element 27 runs coaxially with the axis 30 of rotation for rotatable members of the swivel device 6.

In order to provide a swivel construction where the swivel shaft 19 has a great length in relation to the total length of the swivel device 6, without making the total length unacceptably long, the bearing element 27 is partly or completely arranged within the swivel shaft 19.

To enable separate mounting of the swivel shaft 19 and bearing element 27, the bearing element is mountably arranged at the swivel shaft 19. The mounting of the bearing element is facilitated by providing said element with stop portions 27a limiting the movement of the element in relation to the swivel shaft 19.

The bearing element 27 has at least three bars 27b extending radially from a central portion 27c forming the passage 29 and are uniformly distributed around this, thereby defining the outer passages 28. The bearing element 27 may also have an outer cylindrical portion (not shown) connected to the bars 27b.

In order to keep the inner tubes 7, 8 in a certain position in the swivel device 6, said device is provided with a number of tube centering means 31, 32, 33.

The bearing element 27 may of course have many various designs and be mounted in many ways in the swivel device 6. Eventually the swivel shaft 19 and bearing element 27 may be the very same detail or the bearing element may be completely separated from the swivel shaft 19.

The bearing element 27 may be mounted not to rotate with the shaft 14 of the winding drum, whereby the inner tube 8 is rotatably connected to the element or may be mounted to rotate with the shaft 14, whereby instead the inner tube 7 is rotatably connected to the element. Of course, both inner tubes may be rotatably connected to the bearing element.

At the embodiment shown, both inner tubes 7, 8 project into the passage 29 with such a fit that the required sealing is obtained so that medium in the inner tubes does not leak out at the bearing element 27.

The device according to the invention is, in other words, not limited to the embodiment shown but may be modified according to the following claims. Furthermore, the device may be used for hoses and conduits having inner tubes for the distribution of at least two media, independent of what media to be distributed. In the construction described above, the hose was intended for distributing compressed air and oil to compressed air-driven machines, but hoses for distributing other media, e.g. polyurethane foam and expanding agents therefore or paint and hardeners therefore may also be used at the construction according to the invention.

What I claim is:

1. A hose reel comprising:
   a hollow rotatable shaft supporting a reel having a windable hose thereon communicating with the interior of said hollow shaft;
   a first tubular conduit in said hose and extending into said hollow shaft;
   a tubular swivel shaft rotatable in said hollow shaft and being connected to a stationary hose section having a second tubular conduit therein; and
   a bearing element in said swivel shaft and having outer axial passages providing communication between said windable hose and said stationary hose section, and an inner passage into which said first and second tubular conduits extend, said bearing element having only a stop portion outside of and engaging an end of said swivel shaft.
2. A hose reel as defined in claim 1 wherein said bearing element has bars extending radially from a central portion defining said inner passage, said bars defining uniformly distributed passages around said inner passage for flow of material outside said conduits.

* * * * *